Feb. 25, 1941.  H. S. DAY  2,232,903
LIFTING PLANE
Filed April 10, 1940
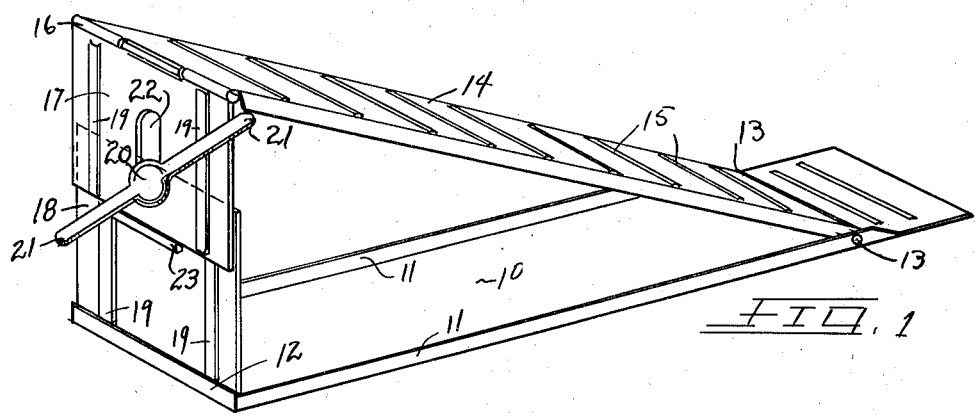
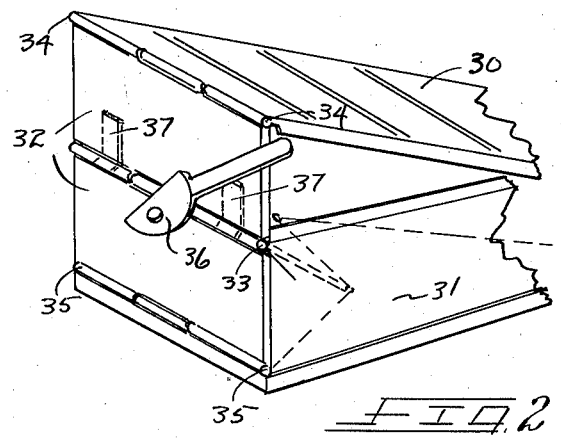
Harry S. Day
INVENTOR.
BY W. B. Harpman
ATTORNEY.

Patented Feb. 25, 1941

2,232,903

UNITED STATES PATENT OFFICE 2,232,903

LIFTING PLANE

Harry S. Day, Youngstown, Ohio, assignor to Hazel F. Hartzell, North Benton, Ohio Application April 10, 1940, Serial No. 328,902

2 Claims. (Cl. 254—88)

This invention relates to a lifting plane adapted to be used for lifting a wheel of an automobile to enable the tire thereon to be changed.

The principal object of this invention is the provision of a collapsible plane which may be placed in erect position in front or in back of a wheel of a motor vehicle and upon which the motor vehicle may then be driven so as to suitably elevate said wheel.

Specifically, the invention comprises a plane adapted to be collapsed after the wheel of a motor vehicle has been sufficiently elevated by driving the same thereon so as to permit the insertion of suitable blocking means under a supporting structure of the vehicle so that a flat tire on the said wheel can readily be changed.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

The invention is illustrated in the accompanying drawing, wherein:

Figure 1 is a perspective view of the collapsible plane showing in detail the features thereof.

Figure 2 is a fragmentary view showing a modified form of the collapsible plane.

By referring to the drawing and Figure 1 in particular it will be seen that a perspective view of the collapsible plane has been shown wherein a base portion 10 with upturned sides 11 and an upturned end section 12 has hinged thereto by means of a hinge 13 an incline member 14 formed in a channel like shape so as to insure the rigidity thereof and provided with a plurality of ribs 15 across its surface upon which the wheel of a motor vehicle may be driven. It will be seen that the incline member 14 is hinged to the base portion 10 by means of the hinge 13 at a point substantially inwardly from the outermost end of the base portion 10 so as to provide an anchoring portion upon which the motor vehicle wheel rests prior to its travel up the incline member 14. This insures the positive placement and action of the plane in relation to the wheel. Supporting this incline member 14 and hinged thereto by means of a hinge 16 there is a collapsible supporting structure comprising a pair of slidably positioned support members 17 and 18 each of which are ribbed with ribs 19 for strength and are ordinarily held in supporting position as shown by means of a bolt 20 having convenient handles 21 formed on the head thereof which engages a threaded opening formed in the vertical support member 18, after passing through a vertical slot 22 in the vertical support member 17. A horizontally positioned protruding rib 23 is formed on the vertical support member 19 immediately below the lower edge of the vertical support member 17 and forms a ledge which normally carries the weight on the plane when the bolt 20 is in tightened position holding the vertical support members 17 and 18 in vertically extended position.

In use the collapsible plane is positioned in front or in back of a wheel to be elevated and upon which an uninflated tire to be changed is located and the motor vehicle moved slightly until the wheel has traveled upwardly on the plane to a point near the hinge 16 thereof thus suitably lifting the wheel of the vehicle by its own power. At this point the brakes are applied holding the motor vehicle in position and a block is positioned beneath the axle or supporting structure of the motor vehicle. When this has been accomplished a simple movement of the handles 21 of the bolt 20 serves to permit the vertical support members 17 and 18 to slide vertically together thus effectively lowering the level of the incline member 14 and permitting the plane to be withdrawn from beneath the motor vehicle wheel. After the tire has been replaced it is only necessary to reset the plane in its elevated position and wedge the same beneath the wheel and drive the car forward slightly so as to effectively release the block beneath the axle. The car may then be allowed to roll off the plane.

By referring to Figure 2 of the drawing a modified form of the collapsing plane is shown wherein alternate structure is used in place of the vertical support members 17 and 18 as shown in Figure 1. In Figure 2 an incline 30 is supported in relation to a base 31 by means of a hinge like supporting structure 32 comprising two sections of suitable material hinged together by means of a hinge 33 and to the incline 30 by means of a hinge 34 and to the base 31 by means of a hinge 35. In order to lock the hinge like supporting structure 32 in vertical supporting position an eccentric latch 36 is pivoted to one portion of the supporting structure and serves to prevent the hinge from collapsing inwardly until the eccentric latch is moved so as to permit this to occur. The hinge like supporting structure 32 is prevented from collapsing outwardly by means of upwardly extending ears 37 formed on one of the hinge like supporting members and adapted to engage the interior surface of the other. It will thus be seen that in order to collapse this modified form of incline plane it is only necessary to move the eccentric latch 36 to a point where it is entirely adjacent one portion of the hinge like supporting structure to be collapsed inwardly thus effectively lowering the incline 30.

What I claim is:

1. A lifting plane comprising a base having an incline member hinged thereto inwardly from the forward end thereof, support means formed at the opposite end of the said incline member and comprising a pair of slidably positioned support members one of which is hinged to the said incline member, a vertical slot formed in one of the support members, a bolt positioned through the said slot and engaging the other one of the said support members so that they may be clamped together thereby.

2. A lifting plane comprising a base member, an incline member pivoted thereto at a point inwardly from the forward end thereof, a vertical support member hinged to the said incline member and adapted to support the said incline member in elevated relation to the said base member, an upturned flange formed on the said base member adapted to insure the accurate positioning of the vertical support member adjacent thereto.

HARRY S. DAY.